United States Patent [19]

Hernden

[11] Patent Number: 4,806,810
[45] Date of Patent: Feb. 21, 1989

[54] FASTENER SEALING SYSTEM FOR FASTENERS EXPOSED TO HIGH AMBIENT TEMPERATURES

[75] Inventor: Michael R. Hernden, Rockford, Ill.

[73] Assignee: Sundstrand Corporation, Rockford, Ill.

[21] Appl. No.: 26,016

[22] Filed: Mar. 16, 1987

[51] Int. Cl.$^4$ ............................................. H02K 5/00
[52] U.S. Cl. ....................................... 310/89; 310/52; 310/54; 310/90; 277/22; 277/112
[58] Field of Search ........................ 310/52, 54, 55, 57, 310/58, 64, 85, 88, 89, 90; 277/22, 112, 116.2, 165

[56] References Cited

U.S. PATENT DOCUMENTS

| | | | |
|---|---|---|---|
| 972,929 | 10/1910 | Search | 310/89 UX |
| 2,018,221 | 10/1935 | Mueller | 310/90.5 |
| 2,623,186 | 12/1952 | Wilde | 310/89 |
| 2,711,491 | 6/1955 | Edmundson et al. | 310/89 X |
| 3,577,972 | 5/1971 | Moray | 277/112 X |
| 3,606,358 | 9/1971 | Tobler | 277/112 X |
| 4,262,224 | 4/1981 | Kofink et al. | 310/89 |

Primary Examiner—Mark O. Budd
Attorney, Agent, or Firm—Wood, Dalton, Phillips, Mason & Rowe

[57] ABSTRACT

In order to provide a fastener sealing system that is operable in an environment of high ambient temperature, while at the same time utilizing seals that are made of materials that are ordinarily not capable of withstanding such high ambient temperature, the system includes a boss integrally associated with a housing defining a cooled interior chamber. The boss has a fastener-receiving opening formed by a bore and a counterbore defining an inwardly projecting shoulder therebetween. In the vicinity of the inwardly projecting shoulder, the boss is exposed to cooling within the cooled interior chamber, and a fastener is provided having a shank portion with a first diameter substantially the same as the diameter of the bore in the boss along a portion of the length thereof and a second diameter substantially the same as the diameter of the counterbore in the boss along the remainder of the length thereof. The fastener is releasably retained within the cooled interior chamber defined by the housing. The system also includes a resilient seal adapted to receive the shank portion of the fastener so as to be located in or near engagement with the inwardly projecting shoulder when the fastener is releasably retained within the cooled interior chamber. With this arrangement, the resilient seal is isolated from the high ambient temperature at a point where the boss is exposed to cooling within the cooled interior chamber in a manner facilitating the utilization of conventional seal materials.

23 Claims, 3 Drawing Sheets 4,806,810

FASTENER SEALING SYSTEM FOR FASTENERS EXPOSED TO HIGH AMBIENT TEMPERATURES

FIELD OF THE INVENTION

The present invention generally relates to sealing systems for fasteners extending through a housing and, more particularly, to such a fastener sealing system for fasteners exposed to high ambient temperatures.

BACKGROUND OF THE INVENTION

In many applications, it is highly desirable to minimize the number of fasteners that extend through a housing. This is particularly true where sealing is required since the fluid to be retained within the housing, which is usually under pressure, can leak at such locations. Nevertheless, it is generally recognized as essentially impossible to completely eliminate this potential source of leakage, e.g., bolts extending through housings.

For instance, the aforementioned problem is known to exist in generators. This is particularly true of internal pressurized gas filled and spray oil cooled generators for use in high ambient temperature environments on the order of 700°-800° F. Such generators are commonly utilized for electrical power in aircraft and the like.

Typically, such generators utilize nitrogen at a pressure on the order of 7 lbs. per square inch and utilize oil for cooling at a pressure on the order of 250 lbs. per square inch. With the ambient temperature generally in the range of between approximately 700°-800° F., the temperature internally of the generator housing is on the order of approximately 250° F. Unfortunately, conventional seals that are utilized under the head of a bolt are not capable of withstanding a temperature above about 500° F. and are therefore not suited for use in environments having such high ambient temperature.

Nevertheless, it would be highly desirable to utilize seals of conventional materials in order to be able to control expenses. These seeming contradictions are further confused by the fact that the seals should be readily accessible from the exterior of the generator housing in order to permit economical periodic maintenance to be performed, e.g., replacement of seals without the need to disassemble the generator. Accordingly, the present invention is directed to overcoming the above stated problems and accomplishing the stated objects.

SUMMARY OF THE INVENTION

An exemplary embodiment of the invention achieves the foregoing in a fastening system for sealing fasteners exposed to high ambient temperature. The system includes a boss integrally associated with a housing defining a cooled interior chamber and having a fastener-receiving opening formed by a bore and a counterbore together defining an inwardly projecting shoulder therebetween. The boss is exposed to cooling means within the cooled interior chamber in the vicinity of the inwardly projecting shoulder. A fastener is provided including a shank portion having a first diameter substantially the same as the diameter of the bore in the boss along a portion of the length thereof and having a second diameter substantially the same as the diameter of the counterbore in the boss along the remainder of the length thereof. The fastener is releasably retained within the cooled interior chamber defined by the housing by means such as a bearing retainer. The system also includes resilient seal means adapted to receive the shank portion of the fastener so as to be compressed against or in close proximity to the inwardly projecting shoulder when the fastener is releasably retained by the bearing retainer.

Preferably, the boss extends from a point adjacent an external surface of the housing to a point inwardly of an internal surface of the housing within the cooled interior chamber remote from the high ambient temperature. Further, the bore advantageously comprises a minor diameter portion of the fastener-receiving opening and the counterbore comprises a major diameter portion of the fastener-receiving opening with the inwardly projecting shoulder disposed therebetween, and the first diameter of the fastener shank portion is advantageously a minor diameter corresponding to the diameter of the bore and the second diameter of the fastener shank portion is a major diameter corresponding to the diameter of the counterbore. With this construction, the resilient seal means can suitably be an O-ring disposed about the minor diameter shank portion of the fastener so as to be compressed between the minor diameter shank portion of the fastener and the major or counterbore diameter portion in close proximity to the inwardly projecting shoulder of the boss.

In the preferred embodiment, the fastener includes a head integral with the major diameter shank portion for engagement with the boss remote from the cooled interior chamber defined by the housing. The head engages the boss when the fastener is retained by releasable retaining means within the cooled interior chamber. Further, the minor diameter shank portion of the fastener is externally threaded for threaded engagement with the releasable retaining means for drawing the head into forced engagement with the boss.

In the preferred embodiment, the major diameter shank portion of the fastener is defined by a sleeve disposed about the minor diameter shank portion of the fastener. The sleeve is of a length sufficient to locate the resilient seal means into a position for sealing engagement against or in close proximity to the inwardly projecting shoulder of the boss since the head of the fastener forces the sleeve against the resilient seal means when the fastener is retained by the resilient retaining means. Still further, the minor diameter shank portion of the fastener extends from the head completely through the sleeve and is externally threaded remote from the head for threaded engagement with the releasable retaining means.

Still further objects, advantages and features of the present invention will become apparent from a consideration of the following specification taken in conjunction with the accompanying drawings.

DETAILED DESCRIPTION OF THE PREFERRED EMBODIMENT

Figure 1:
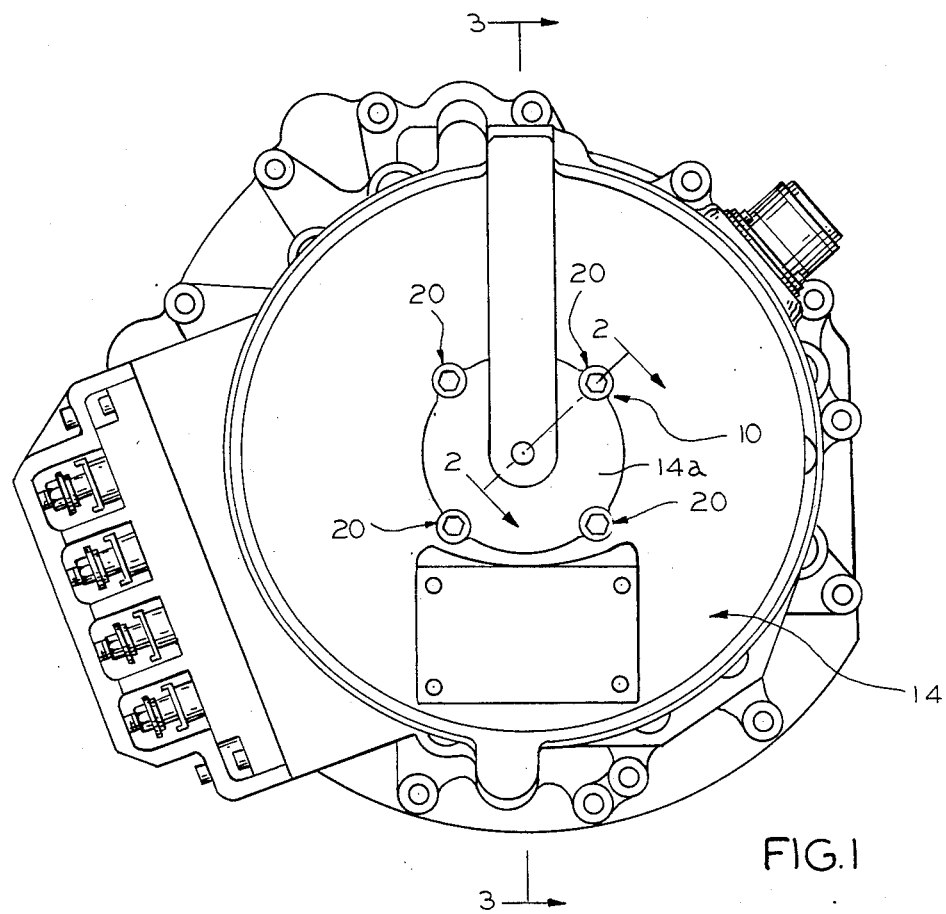
FIG. 1 is an end elevational view of a generator housing utilizing a fastener sealing system in accordance with the present invention.
Figure 2:
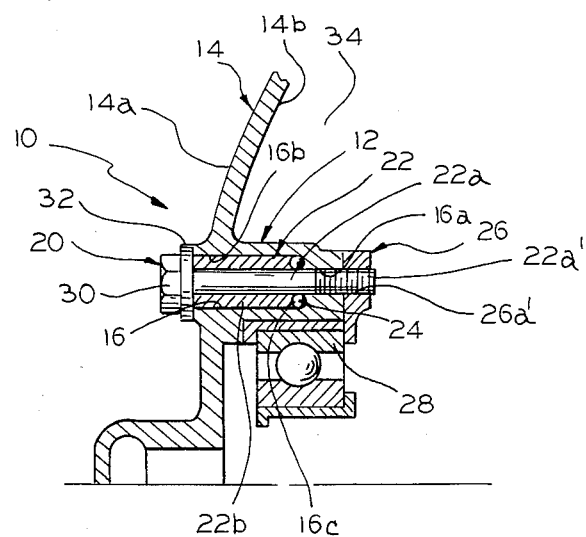
FIG. 2 is a cross-sectional view taken on the line 2—2 of FIG. 1.

Referring to the drawings, and first to FIGS. 1 and 2, the reference numeral 10 designates generally a fastener sealing system in accordance with the present invention. The system 10 includes a boss 12 integrally associated with a housing 14 such as a generator housing. The boss 12 extends from a point adjacent an external surface 14a of the generator housing 14 to a point inwardly of an internal surface 14b of the generator housing 14. The system 10 is designed such that the boss 12 includes a fastener-receiving opening 16 having a first or minor diameter portion 16a and a second or major diameter portion 16b defining an inwardly projecting shoulder 16c therebetween. The boss 12 is exposed to cooling means 18 internally of the generator housing 14 and is adapted to receive a fastener 20 having a shank 22 with a minor diameter portion 22a and a major diameter portion 22b. The system 10 also includes a resilient seal 24 adapted to be disposed about the minor diameter portion 22a of the fastener 20. With this arrangement, the minor and major portions 22a and 22b of the shank 22 are preferably substantially the same diameters as the minor and major diameter portions 16a and 16b of the fastener-receiving opening 16, respectively.

Figure 4:
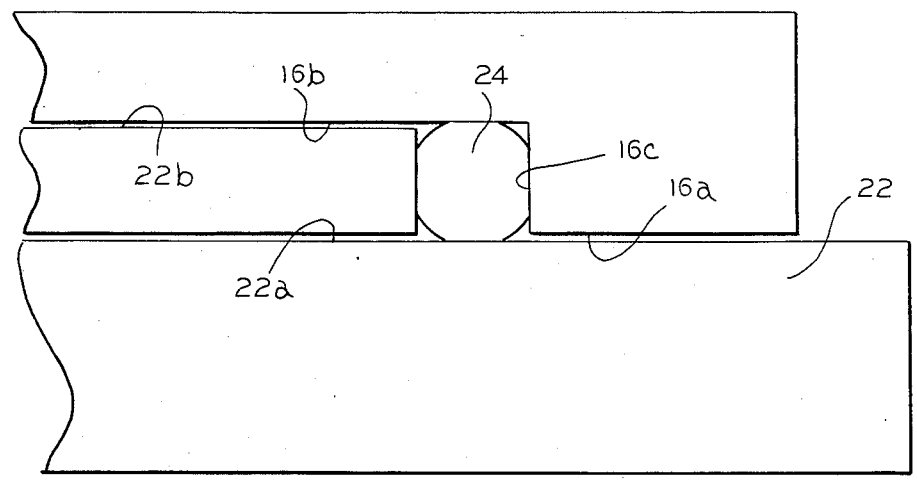
FIG. 4 is an enlarged cross-sectional view of a portion of FIG. 2 illustrating one position for the seal when the fastener sealing system is fully assembled.
Figure 5:
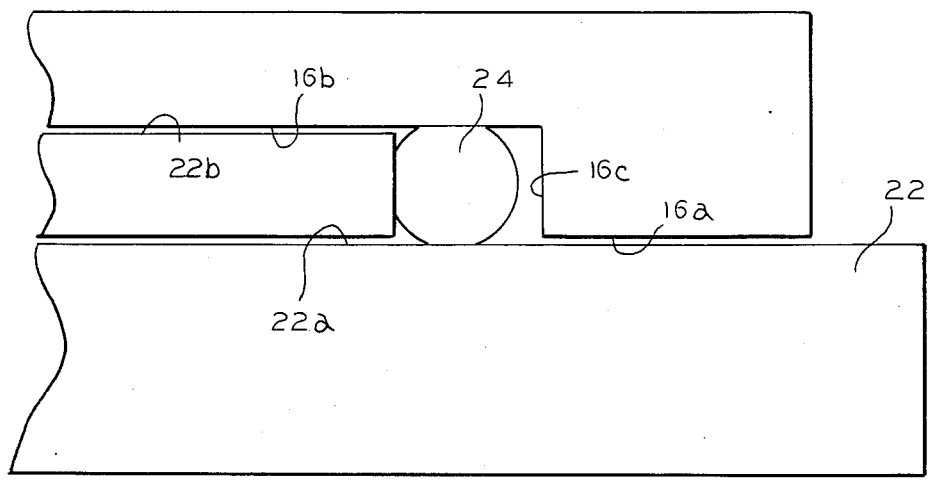
FIG. 5 is an enlarged cross-sectional view of a portion of FIG. 2 illustrating another position for the seal when the fastener sealing system is fully assembled.

As shown in FIG. 2, the system 10 internally of the generator housing 14 includes means 26 for releasably retaining the fastener 20 therewithin. It will also be seen and appreciated that the resilient seal 24 is compressed between the minor diameter portion 22a of the fastener 20 and the major or counterbore diameter portion 16b of the fastener-receiving opening 16 in or near engagement with the inwardly projecting shoulder 16c of the boss 12 when the fastener 20 is retained by the releasable retaining means 26 (see, also, FIGS. 4 and 5). In the preferred embodiment, the releasable retaining means 26 is a bearing retainer adapted to clamp the outer race 28 to the generator housing 14.

As shown in FIGS. 1 and 2, the fastener 20 includes a head 30 integral with the shank 22 for engagement with the boss 12 when the fastener 20 is retained by the bearing retainer 26. It will also be seen that the first or minor diameter portion 22a of the shank 22 is externally threaded as at 22a' for threaded engagement with an internally threaded opening 26a' in the bearing retainer 26. With this construction, the head 30 of the fastener 20 can be drawn into forced engagement with the boss 12 by reason of the cooperation of the external threads as at 22a' and internal threads as at 26a.

As shown in FIG. 2, the second or major diameter portion 22b of the shank 22 is preferably defined by a separate sleeve disposed about the first or minor diameter portion 22a of the shank 22. The sleeve 22b is of a length sufficient to compress the resilient seal 24 against the inwardly projecting shoulder 16c of the boss 12. As will be appreciated, the head 30 is integral with the first or minor diameter portion 22a of the shank 22 for engagement with the sleeve 22b and the boss 12 for forcing the sleeve 22b against the resilient seal 24 when the fastener 20 is retained by the bearing retainer 26. The first or minor diameter portion 22a of the shank 22 extends from the head 20 completely through the sleeve 22b where it is externally threaded as at 22a remote from the head 30. With this construction the head 30 can be drawn into forced engagement with the boss 12 by threadingly engaging the first or minor diameter portion 22a of the shank 22 with the bearing retainer 26.

In the embodiment illustrated in FIG. 2, the fastener 20 comprises an aircraft bolt utilizing a common flat washer 32. It will be appreciated that, as an alternative embodiment, the bolt can be specially formed such that the washer 32 is an integral portion of the head 30 and such that the second or major diameter portion 22b is integral with the first or minor diameter portion 22a of the shank 22, i.e., the shank 22 is a step shank having the general relationship in terms of size and proportion as the separately illustrated components. Moreover, as a further alternative embodiment, the washer 32 can be entirely eliminated or can be separately integral with the head 30.

In any event, when using the sleeve 22b, it is machined to close tolerances so as to slide onto the first or minor diameter portion 22a of the shank 22. This is followed by sliding the resilient seal, which is preferably a tight fitting O-ring, onto the first or minor diameter portion 22a of the shank 22 until it is in engagement with the end of the sleeve 22b remote from the head 30 of the fastener 20. This is followed by inserting the assembly into the fastener-receiving opening 16 and the generator housing 14 until the external threads as at 22a' reach the internally threaded opening as at 26a' in the bearing retainer 26. At this point, the fastener 20 can be tightened to specification with the bearing retainer 26 clamping the bearing outer race 28 tightly against the generator housing 14.

With this construction, the O-ring 24 is sized to fit tightly within the major diameter portion or counterbore 16b of the fastener-receiving opening 16. It will also be appreciated that the O-ring 24 fits tightly against the first or minor diameter portion 22a of the shank 22. Thus, when the O-ring 24 is pressed into position by the sleeve 22b, it forms a highly effective seal preventing loss of gas or oil from the interior of the generator housing 14.

Figure 3:
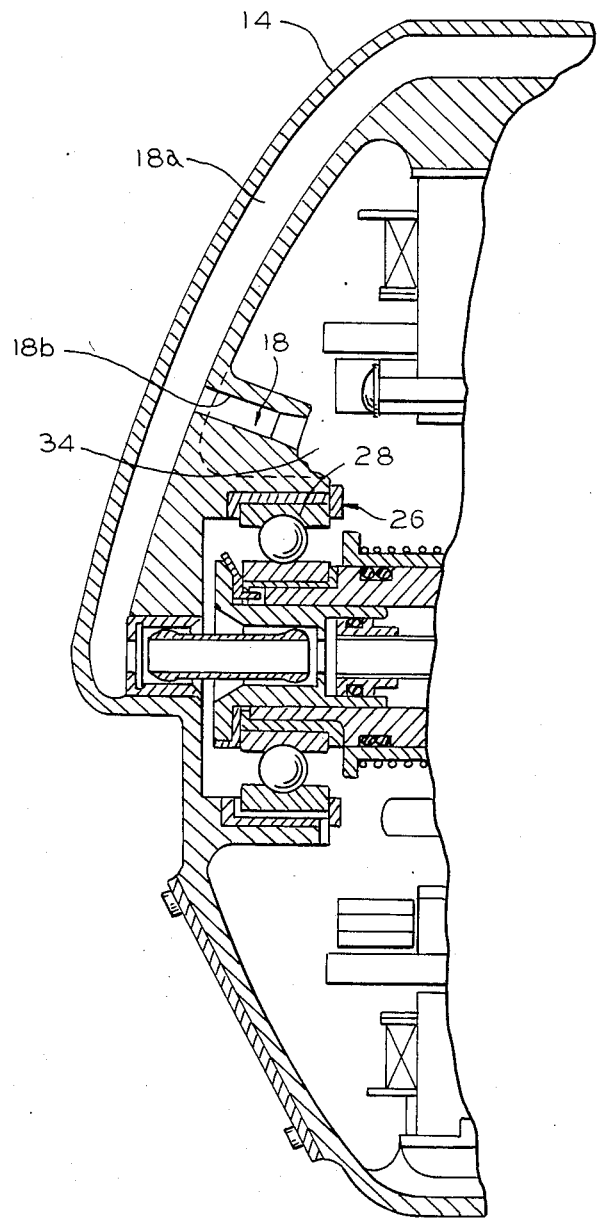
FIG. 3 is a cross-sectional view taken on the line 3—3 of FIG. 1.

Referring now to FIG. 3, the cooling means 18 includes a passage 18a extending therethrough. The oil flows through the passage 18a in the generator housing 14 to cool the generator and also passes through an orifice 18b where it is sprayed into a cooled interior chamber 34 defined by the generator housing 14. As will be appreciated, the oil sprayed through the orifice 18b serves to cool the area surrounding most of the boss 12 (compare FIGS. 2 and 3).

More specifically, the boss 12 is exposed to the spray oil cooling passing through the orifice 18b within the cooled interior chamber 34 in the vicinity of the inwardly projecting shoulder 16c. This is important because of the fact that the resilient seal 24 is disposed in compressed fashion precisely at the inwardly projecting shoulder 16c. As a result, the resilient seal 24 can be made of a less expensive material that need only be capable of withstanding a lower temperature than would be experienced externally of the generator housing 14.

Still more specifically, the resilient seal 24 is disposed at a point remote from the high ambient temperature experienced externally of the generator housing 14. This location, i.e., within the boss 12 at a point within the cooled interior chamber 34, means that the temperature seen by the resilient seal 24 is well within the range of temperatures which conventional O-ring seals are capable of withstanding. Moreover, because of the unique construction of the system 10, it is possible to remove and replace the seal 24 on a field maintenance level without the need for generator housing disassembly.

As shown in FIG. 1, the bearing retainer 26 is adapted to cooperate with four fasteners 20 that extend through the housing 14. This is merely representative, however, since more or less fasteners can be used depending upon the particular application. Moreover, the unique fastener sealing system 10 of the present invention can be utilized for sealing fasteners exposed to high ambient temperatures in many diverse applications.

While in the foregoing, there have been set forth preferred embodiments of the invention, it will be understood by those skilled in the art that the invention is only to be limited by the spirit and scope of the appended claims.

I claim:

1. A sealing system for fastener means extending through a generator housing, comprising:
   a boss integrally associated with said generator housing, said boss extending from a point adjacent an external surface of said generator housing to a point inwardly of an internal surface of said generator housing and including a fastener-receiving opening having a major diameter portion and a minor diameter portion defining an inwardly projecting shoulder therebetween, said boss being exposed to cooling means internally of said generator housing;
   said fastener means including a shank having a major diameter portion and a minor diameter portion, said major and minor diameter portions of said fastener means being of substantially the same diameters as said major and minor diameter portions of said fastener-receiving opening, respectively, and including means internally of said generator housing for releasably retaining said fastener means therewithin; and
   resilient seal means adapted to be disposed about said minor diameter portion of said fastener means, and being compressed between said major diameter portion of said fastener means and said inwardly projecting shoulder of said boss, when said fastener means is retained by said releasable retaining means.

2. The sealing system as defined by claim 1 wherein said fastener means includes a head integral with said shank for engagement with said boss when said fastener means is retained by said releasable retaining means.

3. The sealing system as defined by claim 2 wherein said minor diameter portion of said shank is externally threaded for threaded engagement with an internally threaded opening in said releasable retaining means for drawing said head into forced engagement with said boss.

4. The sealing system as defined by claim 1 wherein said major diameter portion of said shank is defined by a sleeve disposed about said minor diameter portion of said shank, said sleeve being of a length sufficient to locate said resilient seal means in close proximity to said inwardly projecting shoulder of said boss.

5. The sealing system as defined by claim 1 wherein said major diameter portion of said shank is defined by a sleeve disposed about said minor diameter portion of said shank, said sleeve being of a length sufficient to locate said resilient seal means against said inwardly projecting shoulder of said boss.

6. The sealing system as defined by claim 4 wherein said fastener means includes a head integral with said minor diameter portion of said shank for engagement with said sleeve and said boss for forcing said sleeve against said resilient seal means when said fastener means is retained by said releasable retaining means.

7. The sealing system as defined by claim 6 wherein said minor diameter portion of said shank extends from said head completely through said sleeve and is externally threaded remote from said head for threaded engagement with an internally threaded opening in said releasable retaining means for drawing said head into forced engagement with said boss.

8. The sealing system as defined by claim 5 wherein said fastener means includes a head integral with said minor diameter portion of said shank for engagement with said sleeve and said boss for forcing said sleeve against said resilient seal means when said fastener means is retained by said releasable retaining means.

9. The sealing system as defined by claim 8 wherein said minor diameter portion of said shank extends from said head completely through said sleeve and is externally threaded remote from said head for threaded engagement with an internally threaded opening in said releasable retaining means for drawing said head into forced engagement with said boss.

10. The sealing system as defined by claim 1 wherein said fastener means comprises a bolt having a head integral with said shank, said major diameter portion of said shank being defined by a sleeve disposed about said minor diameter portion of said shank, said minor diameter portion of said shank extending from said head completely through said sleeve.

11. The sealing system as defined by claim 10 wherein said sleeve is of a length sufficient to compress said resilient seal means against said inwardly projecting shoulder of said boss, said minor diameter portion of said shank being externally threaded remote from said head for threaded engagement with an internally threaded opening in said releasable retaining means.

12. The sealing system as defined by claim 11 wherein said resilient seal means is an O-ring, said releasable retaining means is a bearing retainer, said cooling means is an oil spray, and including a washer between said head of said bolt and said boss.

13. A fastening system for sealing fasteners exposed to high ambient temperature, comprising:
   a boss integrally associated with a housing defining a cooled interior chamber, said boss including a fastener-receiving opening formed by a bore and a counterbore together defining an inwardly projecting shoulder therebetween, said boss being exposed to cooling means within said cooled interior chamber in the vicinity of said inwardly projecting shoulder;
   a fastener including a shank portion having a first diameter substantially the same as the diameter of said bore in said boss along a portion of the length thereof and having a second diameter substantially the same as the diameter of said counterbore in said boss along the remainder of the length thereof;
   means within said cooled interior chamber for releasably retaining said fastener therewithin; and
   resilient seal means adapted to receive said shank portion of said fastener, and adapted to be compressed in or near engagement with said inwardly projecting shoulder, when said fastener is retained by said releasable retaining means.

14. The fastening system as defined by claim 13 wherein said boss extends from a point adjacent an external surface of said housing to a point inwardly of an internal surface of said housing remote from said high ambient temperature within said cooled interior chamber.

15. The fastening system as defined by claim 13 wherein said bore comprises a minor diameter portion of said fastener-receiving opening and said counterbore comprises a major diameter portion of said fastener-receiving opening with said inwardly projecting shoulder disposed therebetween.

16. The fastening system as defined by claim 13 wherein said first diameter of said fastener shank portion is a minor diameter corresponding to the diameter of said bore and said second diameter of said fastener shank portion is a major diameter corresponding to the diameter of said counterbore.

17. The fastening system as defined by claim 16 wherein said resilient seal means is an O-ring disposed about said minor diameter shank portion of said fastener and being compressed between said minor diameter shank portion of said fastener and said major diameter portion of said fastener-receiving opening.

18. The fastening system as defined by claim 13 wherein said fastener includes a head integral with said shank portion for engagement with said boss remote from said cooled interior chamber when said fastener is retained by said releasable retaining means.

19. The fastening system as defined by claim 18 wherein said first diameter shank portion is externally threaded for threaded engagement with an internally threaded opening in said releasable retaining means for drawing said head into forced engagement with said boss.

20. The fastening system as defined by claim 13 wherein said second diameter shank portion is defined by a sleeve disposed about said first diameter shank portion, said sleeve being of a length sufficient to locate said resilient seal means in a position for sealing engagement with said shank portion of said fastener and said counterbore of said fastener-receiving opening in or near said inwardly projecting shoulder of said boss.

21. The fastening system as defined by claim 20 wherein said fastener includes a head integral with said first diameter shank portion for engagement with said sleeve and said boss for forcing said sleeve against the said resilient seal means when said fastener is retained by said resilient retaining means.

22. The fastening system as defined by claim 21 wherein said first diameter shank portion extends from said head completely through said sleeve and is externally threaded remote from said head for threaded engagement with an internally threaded opening in said releasable retaining means for drawing said head into forced engagement with said boss.

23. The fastening system as defined by claim 22 wherein said resilient seal means is an O-ring, said releasable retaining means is a bearing retainer, said cooling means is an oil spray, and including a washer between said head of said fastener and said boss.

* * * * *